Sept. 16, 1969 W. M. P. STUART ETAL 3,466,974
PANTOGRAPHIC MILLING MACHINE
Filed Nov. 14, 1966 2 Sheets-Sheet 1

INVENTORS
WHITFIELD M. P. STUART
DEREK M. STUART
BY
*Fetherstonhaugh & Co.*
ATTORNEYS

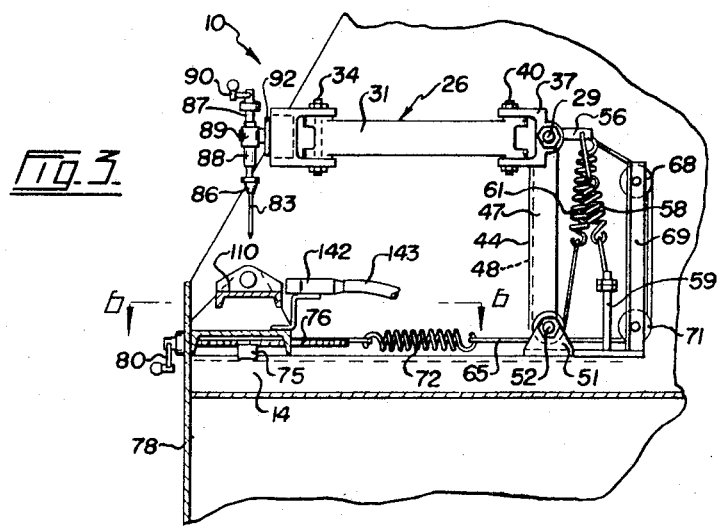
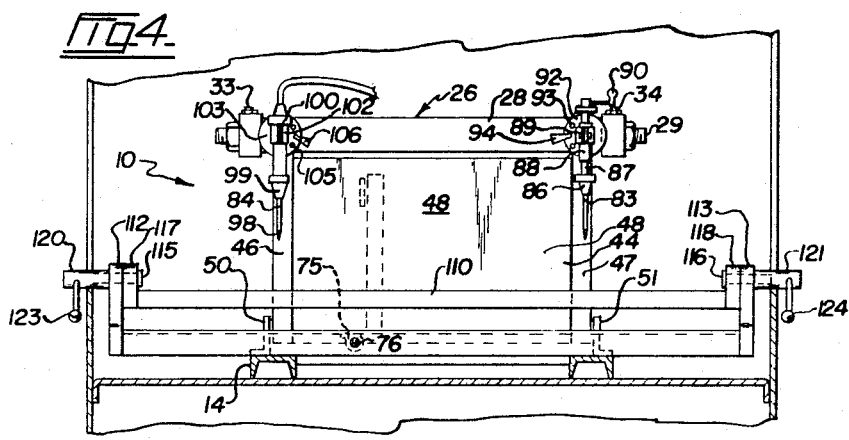
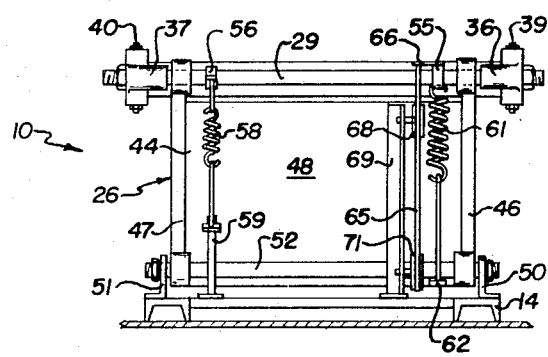

United States Patent Office 3,466,974
Patented Sept. 16, 1969

3,466,974
PANTOGRAPHIC MILLING MACHINE
Whitfield M. P. Stuart and Derek M. Stuart, both of 5910
Charles St., Burnaby, British Columbia, Canada
Filed Nov. 14, 1966, Ser. No. 593,828
Int. Cl. B23c 1/16
U.S. Cl. 90—13.1
15 Claims

ABSTRACT OF THE DISCLOSURE

A pantographic milling machine incorporating a vertical support hingedly mounted at a lower end thereof, a pantographic frame mounted on the upper end of the support for both horizontal and vertical swinging movement, resilient means normally retaining the support and the frame in predetermined positions, tracer and cutter styluses mounted on the frame in parallelism and extending downwardly therefrom, a work table mounted beneath the styluses, and clamping means on the table for holding a pattern and a blank in line with the tracer stylus and the cutter stylus respectively.

---

Figure 1:
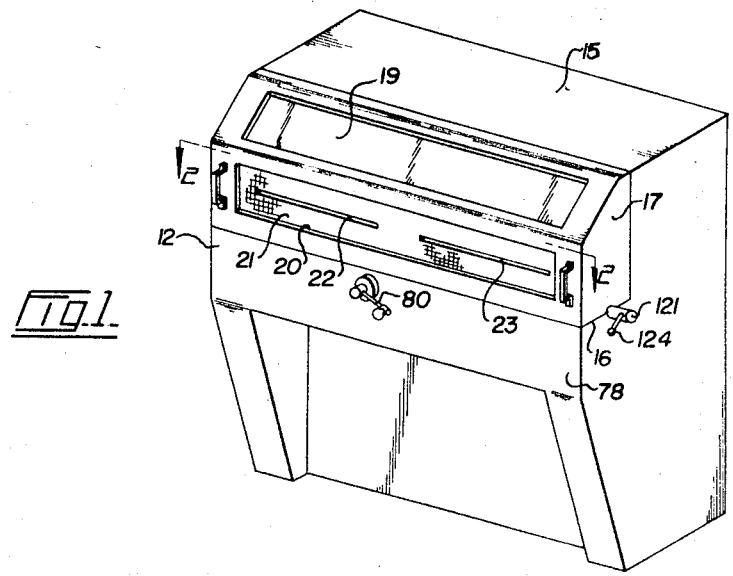

This invention relates to a pantographic machine for milling exact duplicates of patterns, which are usually of three dimensional configuration.

The present machine may be used for milling or cutting any shape or design from a corresponding pattern, but it is primarily designed for making electrodes for spark erosion apparatus which are exact copies of pattern electrodes. The machine is especially designed for working graphite, brass, copper or zinc base electrodes directly from a pattern, tracing or form, of any material strong enough to permit a stylus to be moved over the surface thereof.

A pantographic milling machine according to the present invention includes a pantographic frame spaced from a work table and mounted for movement substantially parallel with and towards and away from the table. Means connected to the frame normally retains it in a predetermined plane relative to the table. Tracer and cutter styluses are mounted on this frame in parallelism and extends towards the table. Suitable clamping means is provided on the table for holding a pattern and a blank in line with the tracer stylus and the cutter stylus respectively.

The cutter stylus is preferably in the form of a conical cutter which is rotated at high speeds by a suitable motor. The tracer stylus is preferably of conical shape to match the conical cutter. Adjustable means mounts the styluses on the pantographic frame, said means being adjustable to retain the styluses in different angular positions relative to the work table while retaining these styluses in parallelism.

Suitable means is provided for resiliently retaining the pantographic frame in its normal position, said means being adjustable so that the force opposing the swinging action of the frame out of its normal position can be adjusted.

A feature of this milling machine is that the work table is tiltable relative to the pantographic frame, and can be retained in any desired angular position relative to said frame. This arrangement permits easy access to all parts of the pattern and the workpiece, and although a conical cutter is used, internal square corners can be cut by it.

It is preferable to use a high speed air turbine to rotate the cutter stylus. The average speed of rotation is around 22,000 r.p.m. but the machine can be operated up to about 80,000 r.p.m.

Advantages of the present machine are that the workpiece is cut at a ratio of 1 to 1 relative to the pattern, three dimensional patterns can be exactly copied, the pantographic frame can be balanced to provide "feather light" movement thereof, the counterbalancing can be quickly and easily adjusted to provide a heavy or a light feeling in the movement of the frame, the tilting table and adjustable styluses enable internal square corners to be cut in the blanks, and the exhaust from the air turbine can be discharged in the direction of the cutter stylus constantly to remove particles from the face of the blank as these particles are cut therefrom, and the expanding exhaust air from the motor keeps the cutter stylus cool.

Figure 2:
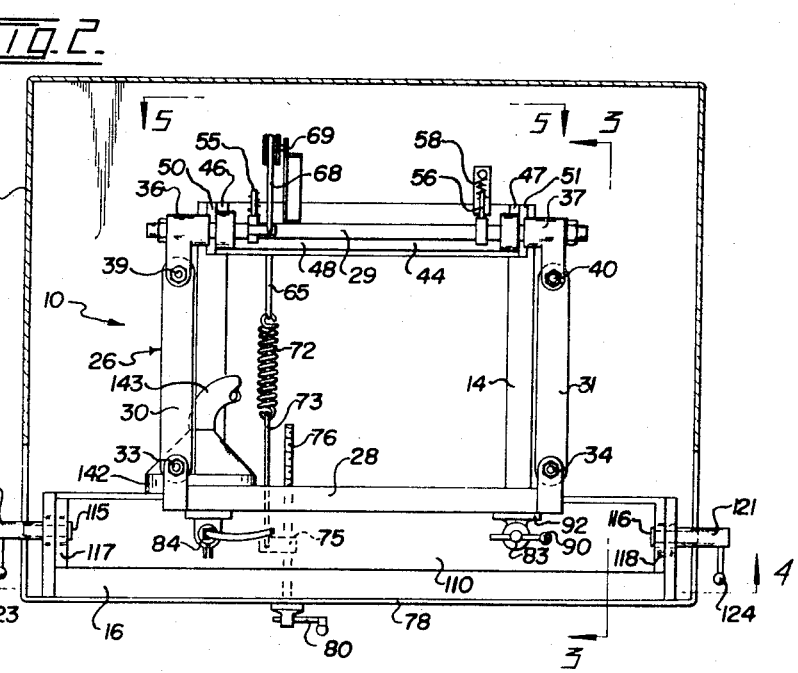
Figure 6:
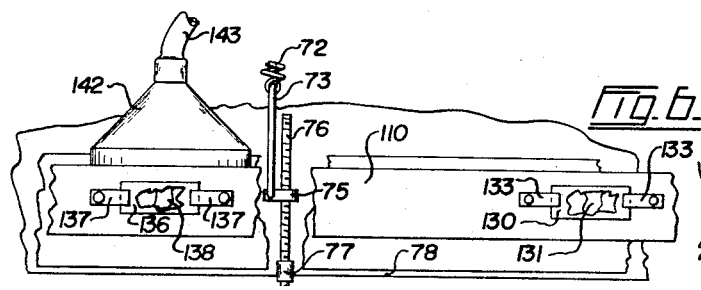

An example of this invention is illustrated in the accompanying drawings, in which:

FIGURE 1 is a perspective view of a pantographic milling machine according to this invention with the cover thereof in working position, FIGURE 2 is a horizontal section taken on the line 2—2 of FIGURE 1, showing the milling machine in plan, FIGURE 3 is a vertical section taken on the line 3—3 of FIGURE 2, showing the machine in side elevation, FIGURE 4 is a cross section taken on the line 4—4 of FIGURE 2, showing the machine in front elevation, FIGURE 5 is a section taken on the line 5—5 of FIGURE 2, showing the machine in rear elevation, and FIGURE 6 is a horizontal fragmentary section taken on the line 6—6 of FIGURE 3.

Referring to the drawings, 10 is a pantographic milling machine according to the present invention mounted in a suitable casing 12. A substantially horizontal base 14 is mounted in casing 12 and constitutes the base of machine 10. The casing includes a hood section 15 enclosing most of machine 10, and has an opening 16 which is normally closed by a cover 17. This cover has an inclined window 19 through which an operator can see machine 10, and a large elongated opening 20 below this window. The opening is covered or closed by a wall 21 formed of a suitable fabric, such as canvas, and has slots 22 and 23 therein through which the operator can insert his hands to operate machine 10.

Machine 10 includes a pantographic frame 26 made up of front and rear members 28 and 29, and side arms 30 and 31. Front ends of arms 30 and 31 are hingedly connected to ends of front member 28 by vertical hinge pins 33 and 34, respectively. Rear or back ends of these side arms are hingedly connected to ends of back member 29. In this example, back member 29 is in the form of a shaft, and sleeves 36 and 37 are fixedly mounted on ends of this shaft and, in effect, are part of the back member. The back ends of arms 30 and 31 are connected by vertical hinge pins 39 and 40 to sleeves 36 and 37, see FIGURE 2. With this arrangement, front member 28 and side arms 30 and 31 can be swung relative to back member or shaft 29 in a substantially horizontal plane, during which time the front and back members remain parallel to each other.

A support 44 is provided for frame 26, see FIGURE 3. In this example, support 44 comprises a pair of substantially vertical arms 46 and 47 interconnected by a web 48. The upper ends of these arms form bearings in which shaft 29 is journalled, and the lower ends of said arms are hingedly connected to brackets 50 and 51 by a shaft 52, said brackets being mounted on and projecting upwardly from base 14, see FIGURE 5.

Suitable counterbalancing means is provided for retaining pantographic frame 26 in a substantially horizontal position. In this example, fingers 55 and 56 are secured to and project rearwardly from shaft 29 adjacent support arms 46 and 47, see FIGURE 2. A spring 58 is connected to finger 56 and extends downwardly therefrom, the opposite end of said spring being anchored to base 14 by a bolt 59. Another spring 61 is connected to finger 55 and extends downwardly therefrom, the lower end of said spring being connected by a connector 62 to support web 48 near the lower edge thereof. It will be noted from FIGURE 3 that anchor bolt 59 is spaced rearwardly a little from the lower portion of support 44. The tension of spring 61 is such as normally to maintain frame 26 in a horizontal position, and the tension of this spring is not materially affected by any swinging movement of support 44 around shaft 52. Spring 58 helps to maintain the pantographic frame in the horizontal position, and it retains support 44 in a substantially vertical position. If frame 26 is drawn forwardly, at which time support 44 swings about shaft 52, the tension on spring 58 is increased, and when the frame is released, this spring returns support 44 to its vertical position.

Suitable means is provided for adjusting the tension that retains frame 26 and support 44 in their normal positions. In this example, a cable 65 is connected to a finger 66 which is secured to shaft 29 and has an end spaced a little above said shaft. Cable 65 extends rearwardly and downwardly from finger 66 and over a pulley 68 mounted on the upper end of a standard 69, the lower end of which is mounted on base 14. Cable 65 extends around another pulley 71 mounted on standard 69 near the lower end thereof, said cable extending forwardly beneath support 44 to a spring 72. The opposite end of this spring is connected by a cable 73 to a nut 75 threaded on a relatively long screw 76 which, in turn, rotatably extends through a suitable bearing 77 in the front wall 78 of casing 12 below opening 16 thereof. Screw 76 is rotated by means of a handle 80 secured to its outer end.

Rotation of screw 76 increases or decreases the tension of spring 72 and, therefore, the pull of cable 75 on frame 26 and support 44. As the pull of cable 65 is in a rearward direction, it assists in maintaining support 44 in its upright position, and as finger 66 is connected to but has an end positioned above shaft 29, the pull of this cable tends to rotate the shaft to swing frame 26 upwardly. Thus, the normal or neutral position of the pantographic frame is adjusted by increasing or decreasing the tension of spring 72.

A tracer stylus 83 and a cutter stylus 84 are mounted on and extend downwardly from front member 28 of frame 26 parallel with each other.

In this example, tracer stylus 83 is gripped by a chuck 86 on the lower end of a shaft 87 slidably mounted in a sleeve 88, said sleeve being positioned in and gripped by a clamp 89. A handle 90 is so connected to the upper end of shaft 87 above sleeve 88 that rotation of the handle raises or lowers said shaft. Clamp 89 is secured to and projects outwardly from a disc 92 which lies substantially in a vertical plane and is rotatably mounted on member 28. A plurality of tapped holes 93 are formed in disc 92 and are concentrically arranged around the centre of rotation thereof. A threaded pin 94 is screwed into a selected one of holes 93, at which time, the pin extends into a hole formed in member 28 behind the disc. When pin 94 is removed, stylus 83 may be swung into inclined or vertical positions and locked therein by turning pin 94 into the hole 93 aligned with the hole in the member therebeneath.

Cutter stylus 84 comprises a conical cutter 98 fitting into the chuck 99 of a suitable high speed motor 100. Although this may be an electrical motor, it is preferable to use an air turbine motor. Motor 100 is gripped by a clamp 102 projecting outwardly from a rotatably mounted disc 103 similar to disc 92, said disc 103 being rotatably mounted on frame member 28. Disc 103 has tapped holes 105 therein by means of which a threaded pin 106 can removably secure disc 103 to front member 28. Holes 105 correspond to and are positioned in exactly the same manner as holes 93 of disc 92. If cutter stylus 83 is in a vertical position or in a certain inclined position, cutter stylus 84 is retained in the corresponding vertical position or inclined position so that the two styluses are always kept parallel to each other.

As cutter 98 is of conical shape, stylus 83 also is conical and corresponds to the cutter stylus.

A work table 110 is mounted on base 14 beneath styluses 83 and 84. This table is normally in a horizontal position. Although the table may be fixed in this position, it is preferably mounted so that it can be tilted out of the horizontal plane. In this example, brackets 112 and 113 are mounted on base 14 and project upwardly therefrom at opposite ends of table 110. Headed bolts 115 and 116 extend through flanges 117 and 118 projecting upwardly from table 110 and the adjacent brackets 112 and 113. Sleeve-type nuts 120 and 121 are threaded on the other ends of bolts 115 and 116, said nuts having turning handles 123 and 124, respectively.

Suitable means is provided on table 110 for clamping a pattern and a blank thereon. In the illustrated example, a plate 130 having a pattern 131 thereon is removably secured to table 110 by clamping lugs 133, see FIGURE 6. The pattern is retained directly beneath stylus 83. A similar plate 136 is retained on the table by clamping lugs 137, said plate having a blank 138 thereon which is to be cut into the same shape as pattern 133. Blank 138 is located immediately beneath stylus 84.

A suction nozzle 142 is mounted on base 14 immediately behind the portion of table 110 where the blank is clamped. This nozzle is connected by a hose 143 to a suitable suction device, not shown.

The operation of apparatus 10 is very simple. The operator grasps sleeve 88 or clamp 89 in one hand, and if desired, he grasps clamp 102 in the other hand. Pantographic frame 26 is shifted and the point of tracer stylus 83 is moved over pattern 131. This causes cutter stylus 84 to move in exactly the same manner over blank 138, and as motor 100 is rotating cutter 98 at high speed, the blank is cut away until it eventually attains exactly the same shape as the pattern. The hinges at the four corners of frame 26, and the hinge connections at the upper and lower ends of support 44 make it possible very easily to move the styluses horizontally in any direction and up and down relative to the pattern and the blank. By turning handle 80, the counterbalancing of the pantographic frame can be adjusted so that the operator will have a light touch or a heavy touch with tracer stylus 83, as he desires. When necessary, handles 123 and 124 may be turned to release table 110 so that it can be tilted forwardly or rearwardly relative to the styluses, and the tightening of these handles retains the table in the new position. This tilting of the table makes it possible to cut vertical surfaces even though cutter 98 is of conical shape. The table is tilted so that the effective cutting portion of the cutter is in a plane extending perpendicular to the table and the blank thereon. Pin 94 can be removed to enable the tracer stylus to be shifted to a desired angle relative to the table, in which case pin 106 is removed to enable the cutter stylus to be tipped to exactly the same angle as the tracer stylus so that the two styluses remain parallel to each other during operation of the machine.

One of the advantages of using an air turbine motor 100 is that the air exhaust therefrom can be directed towards cutter stylus 84 so that particles cut out of the blank by the cutter stylus are blown off the surface of said blank. Suction nozzle 142 removes these particles as they are formed. Usually when the apparatus is in operation, cover 17 is closed, in which case the operator inserts his hands through slots 22 and 23 in order to manipulate the pantographic frame.

What we claim as our invention is:

1. A pantographic milling machine comprising a base, a pair of vertical support arms hingedly mounted at lower ends thereof on the base for parallel swinging movement towards and away from a front edge of the base, a shaft journalled in upper ends of said arms, a pair of laterally-spaced parallel side arms having inner ends adjacent the shaft and extending away from said shaft, connecting means securing said inner ends of the side arms to the shaft while permitting said side arms to swing laterally, said side arms swinging vertically when the shaft is rotated in the vertical arms, a front member parallel to the shaft and hingedly connected to front ends of said side arms, tracer and cutter styluses mounted in parallelism on the front member and extending downwardly relative thereto, a work table mounted on the base beneath said styluses, first spring means connected to the vertical arms for normally retaining said vertical arms in substantially vertical positions, second spring means connected to said shaft to rotate the latter and retain said side arms in a substantially horizontal plane during swinging movement of the vertical arms and permitting vertical swinging movement of the side arms, said first and second spring means permitting the upper ends of the vertical arms and the front ends of the side arms to be swung towards and away from said work table without interfering with horizontal swinging movement of said side arms, and clamping means on the table for holding a pattern and a blank beneath the tracer stylus and the cutter stylus respectively.

2. A machine as claimed in claim 1 in which the work table is mounted for tilting movement relative to a plane lying perpendicular to the styluses, and including means for retaining said table in any position to which it has been moved.

3. A machine as claimed in claim 1 including adjustable means mounting the styluses on said frame for retaining said styluses in different angular positions relating to the work table while retaining the styluses in parallelism.

4. A machine as claimed in claim 1 in which the cutter stylus comprises a conical cutter driven at high speeds by a motor.

5. A machine as claimed in claim 4 in which the tracer stylus is of conical shape to match said conical cutter.

6. A machine as claimed in claim 1 including adjustable means mounting the styluses on said frame for retaining said styluses in different angular positions relating to the work table while retaining the styluses in parallelism.

7. A machine as claimed in claim 1 including suction means mounted near the blank clamping means for removing particles cut out of the blank by the cutter stylus.

8. A machine as claimed in claim 1 in which said first spring means comprises a substantially horizontal first finger connected to and radiating from said shaft, a spring connected at one end to the finger and inclined downwardly therefrom and towards a rear edge of the base, and anchor means connecting the opposite end of said spring to the base, said spring normally maintaining the side arms in a horizontal position without the tension of said spring being materially affected by any swinging movement of the vertical arms.

9. A machine as claimed in claim 8 including means for adjusting the normal positions of the side arms and vertical arms, comprising a finger connected to the shaft and having an end spaced above said shaft, pulley means located below the level of the shaft and on the side thereof remote from the side arms, a cable connected to said finger end and extending downwardly over said pulley means, spring means connected to the cable, and means connected to said spring means operable to adjust the tension thereof.

10. A machine as claimed in claim 1 in which said second spring means comprises a substantially horizontal second finger connected to said shaft and radiating therefrom, a spring connected at one end to the second finger and extending downwardly therefrom, and anchor means connecting the opposite end of said spring to the vertical arms near the lower ends thereof.

11. A machine as claimed in claim 1 including means for adjusting the normal positions of the side arms and vertical arms, comprising a finger connected to the shaft and having an end spaced above said shaft, pulley means located below the level of the shaft and on the side thereof remote from the side arms, a cable connected to said finger end and extending downwardly over said pulley means, spring means connected to the cable, and means connected to said spring means operable to adjust the tension thereof.

12. A machine as claimed in claim 1 including flanges projecting upwardly from the table adjacent ends thereof, fixedly mounted brackets projecting upwardly adjacent said flanges, a headed bolt extending through each flange and the adjacent bracket, nuts threaded on said bolts, and turning handles connected to said nuts, whereby said work table can be swung into different positions relative to the styluses and secured in any position to which it has been moved by said nuts.

13. A pantographic milling machine comprising a substantially horizontal work table, a pantographic frame mounted above the table and including two side arms and front and back members hingedly connected together at ends thereof to permit horizontal swinging movement of the frame relative to the back member thereof, a substantially vertical support hingedly mounted at a lower end thereof and hingedly connected at an upper end to said back member, said upper end of the support being swingable towards and away from the work table, resilient means connected to the frame for normally retaining the latter in a substantially horizontal plane, resilient means connected to the vertical support for normally retaining said support in a vertical plane, tracer and cutter styluses mounted in parallelism on the front member of the frame and extending towards the table, said cutter stylus comprising a conical cutter driven at high speeds by an air turbine motor positioned so that exhaust air therefrom is directed towards said cutter stylus, and clamping means on the table for holding a pattern and a blank in line with the tracer stylus and the cutter stylus respectively.

14. A pantographic milling machine comprising a substantially horizontal table mounted for tilting movement relative to the horizontal, means for retaining the table in any position to which it is moved, a pantographic frame mounted above the table and including two side arms and front and back members hingedly connected together at ends thereof to permit horizontal swinging movement of the frame relative to the back member thereof, said back member comprising a shaft on which adjacent ends of the side arms are journalled, a substantially vertical support hingedly mounted at a lower end thereof and journalled at its upper end on said shaft, said upper end of the support being swingable towards and away from the work table, a first finger connected to said shaft and projecting horizontally away from the frame, at least one spring anchored at a lower end and connected at an upper end to said first finger to retain the frame in a substantially horizontal plane, a second finger connected to the shaft and extending upwardly therefrom, a cable connected to said second finger and extending downwardly therefrom, a spring connected to said cable, tensioning means connected to said spring operable to increase and decrease the tension on said cable, a conical cutter stylus connected to a high speed air motor, a conical tracer stylus corresponding to and parallel with said cutter stylus, said motor being positioned to direct air exhaust therefrom towards the cutter stylus, adjustable means connecting said styluses on the front member of the frame for retaining the styluses in different angular positions relating to the work table while retaining the styluses in parallelism, and clamping means on the table for holding a pattern and a blank in line with the tracer stylus and the cutter stylus respectively.

15. A pantographic milling machine comprising a work table, a pantographic frame spaced from the table and mounted for movement substantially parallel with and towards and away from said table, means connected to the frame for normally retaining the latter in a predetermined plane, tracer and cutter styluses mounted on the frame in parallelism and extending towards the table, and clamping means on the table for holding a pattern and a blank in line with the tracer stylus and the cutter stylus respectively, said cutter stylus comprising a conical cutter driven at high speeds by an air turbine motor positioned so that exhaust air therefrom is directed towards said cutter.

References Cited

UNITED STATES PATENTS

| | | | |
|---|---|---|---|
| 135,998 | 2/1873 | Minter | 90—13.1 |
| 1,039,406 | 9/1912 | Hundriesser | 90—13.1 |
| 2,656,604 | 10/1953 | Scruggs | 90—13.1 |
| 2,793,569 | 5/1957 | Tanner et al. | 90—13.1 |
| 2,812,694 | 11/1957 | Reichard et al. | 90—13.1 |
| 2,870,687 | 1/1959 | Roberts et al. | 90—13 |
| 2,958,131 | 11/1960 | Keene | 33—23 |
| 3,068,576 | 12/1962 | Giepen | 90—13.1 |
| 3,211,061 | 10/1965 | Cretsinger | 90—13.1 |
| 3,299,779 | 1/1967 | Wolf | 33—25 |

FOREIGN PATENTS 105,299  4/1923  Switzerland.

GERALD A. DOST, Primary Examiner

U.S. Cl. X.R.

33—25